United States Patent [19]
Barton et al.

[11] Patent Number: 5,686,200
[45] Date of Patent: Nov. 11, 1997

[54] ELECTROCHEMICAL FUEL CELL ASSEMBLY WITH COMPLIANT COMPRESSION MECHANISM

[75] Inventors: Russell H. Barton, New Westminster; Henry H. Voss, West Vancouver, both of Canada

[73] Assignee: Ballard Power Systems Inc., Canada

[21] Appl. No.: 485,644

[22] Filed: Jun. 7, 1995

Related U.S. Application Data

[63] Continuation-in-part of Ser. No. 171,732, Dec. 22, 1993, Pat. No. 5,470,671.
[51] Int. Cl.⁶ .................................................. H01M 8/02
[52] U.S. Cl. .................................................. 429/37
[58] Field of Search .................................. 429/30, 33, 34, 429/37

[56] References Cited

U.S. PATENT DOCUMENTS

| | | |
|---|---|---|
| 4,430,390 | 2/1984 | Fekete . |
| 4,849,308 | 7/1989 | Schmitten et al. . |
| 4,988,583 | 1/1991 | Watkins et al. . |
| 5,252,410 | 10/1993 | Wilkinson et al. . |

FOREIGN PATENT DOCUMENTS

| | | |
|---|---|---|
| 0098676 | 1/1984 | European Pat. Off. . |
| 43 29 819 | 2/1995 | Germany . |
| 44 42 285 | 2/1996 | Germany . |
| 60-163378 | 8/1985 | Japan . |
| 61-161671 | 7/1986 | Japan . |
| 2-049360 | 2/1990 | Japan . |
| 7-029592 | 1/1995 | Japan . |

*Primary Examiner*—M. Nuzzolillo
*Attorney, Agent, or Firm*—McAndrews, Held & Malloy, Ltd.

[57] ABSTRACT

An electrochemical fuel cell assembly with compliant compression mechanism includes a first plate, a second plate, and at least one membrane electrode assembly disposed between the first and second plates. Compliant compression members, such as twisted wire springs or ribbon springs, extend between the first and second plates such that the compression members urge the first plate toward said second plate to compress each membrane electrode assembly interposed between the plates. In operation, compressive force is applied by the compression members to each membrane electrode assembly to maintain electrical conductivity.

13 Claims, 11 Drawing Sheets

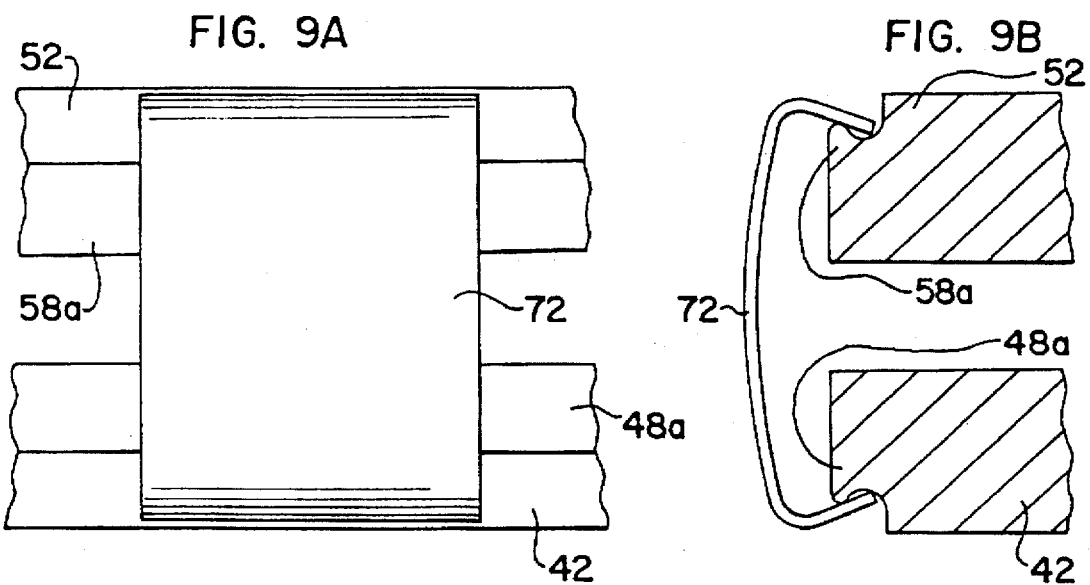
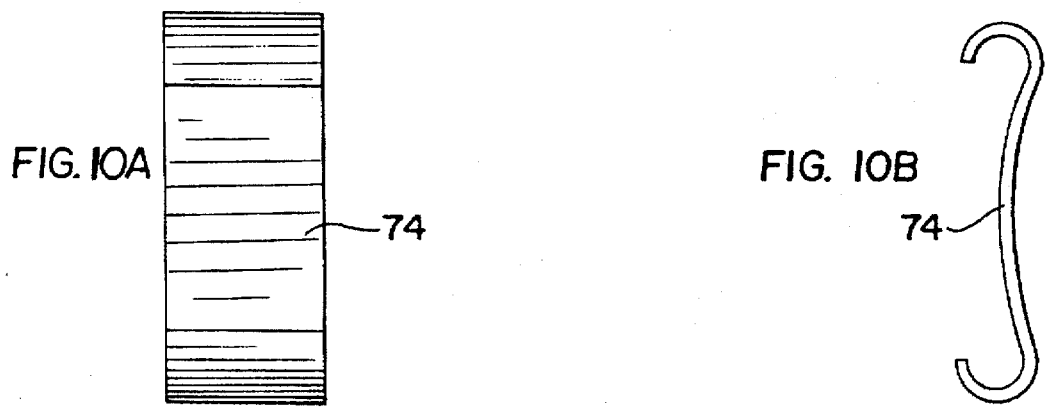
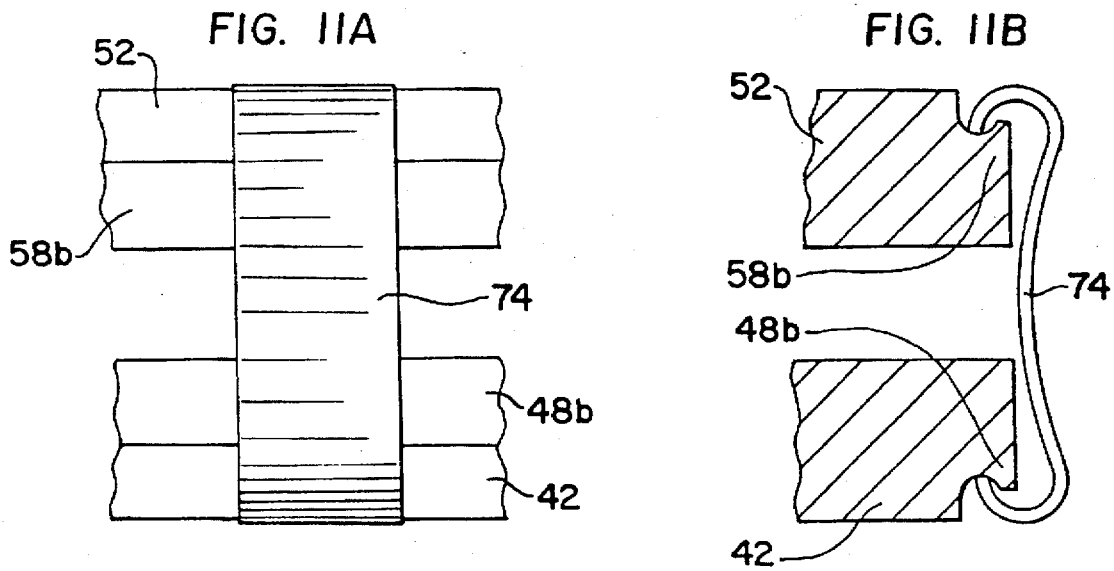

ELECTROCHEMICAL FUEL CELL ASSEMBLY WITH COMPLIANT COMPRESSION MECHANISM

CROSS-REFERENCE TO RELATED APPLICATION

This application is a continuation-in-part of U.S. patent application Ser. No. 08/171,732 filed Dec. 22, 1993, entitled "Electrochemical Fuel Cell Employing Ambient Air As the Oxidant And Coolant", now U.S. Pat. No. 5,470,671. The '732 application is incorporated herein by reference in its entirety.

FIELD OF THE INVENTION

This invention relates generally to electrochemical fuel cells and, more particularly, to a fuel cell in which compliant compression members align and apply compressive force to the plates between which the membrane electrode assembly is disposed.

BACKGROUND OF THE INVENTION

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes through an external load.

At the anode, the fuel is transported through the porous electrode material and reacts at the catalyst layer to form cations, which migrate through the membrane to the cathode. At the cathode, the oxygen in the oxidant supply reacts with the cations at the catalyst layer to form a reaction product. In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode catalyst layer, oxygen reacts with the hydrogen ions that have crossed the membrane to form liquid water as the reaction product. The anode and cathode reactions in hydrogen/oxygen fuel cells are shown in the following equations:

Anode reaction: $H_2 \rightarrow 2H^+ + 2e^-$ 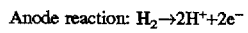

Cathode reaction: $1/2 O_2 + 2H^+ + 2e^- \rightarrow H_2O$ 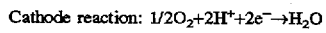

Two or more fuel cells can be connected together in series or in parallel to increase overall power output. A series-connected multiple fuel cell arrangement is commonly referred to as a fuel cell stack.

Illustrative fuel cell and stack assemblies are described in U.S. Pat. No. 4,988,583 entitled "Novel Fuel Cell Fluid Flow Field Plate" and U.S. Pat. No. 5,252,410 entitled "Lightweight Fuel Cell Membrane Electrode Assembly With Integral Reactant Flow Passages", both of which are incorporated herein by reference in their entireties.

In ambient fuel cells, one of the surfaces of the cathode is exposed to the atmosphere. Oxygen-containing air is introduced as the oxidant supply to the fuel cell through the exposed cathode surface, and product water is expelled to the atmosphere through the exposed cathode surface. Ambient fuel cells also include fuel cells with exposed cathode surfaces at which oxygen-containing air is directed by mechanical means such as, for example, by a fan.

Ambient fuel cells of the type described in U.S. application Ser. No. 08/171,732, may employ various types of membrane electrode assembly ("MEA") configurations, including a bicell or a unicell MEA. As the cross-section of the MEA is traversed, the bicell MEA includes, in order, a first cathode, an anode, and a second cathode. A first ion exchange membrane is interposed between the first cathode and the anode. A second ion exchange membrane is interposed between the second cathode and the anode. A fuel supply line and inlet contain and direct fuel at a pressure slightly greater than atmospheric to the anode.

In a bicell ambient fuel cell, the fluid fuel reacts at the anode to produce cations and electrons. When hydrogen is employed as the fuel, the reaction at the anode produces hydrogen cations (protons) and electrons in accordance with the chemical equation for the anode reaction set forth above. The surface of the first and second cathodes facing away from the membrane communicate with the ambient oxygen-containing environment. The reaction at the first and second cathodes produces water in accordance with the chemical equation for the cathode reaction set forth above. The first and second ion exchange membranes facilitate the migration of cations from the centrally-disposed anode to the first and second cathodes. In addition to conducting hydrogen cations, the ion exchange membranes can be sealed together to isolate the fluid fuel stream directed across the anode from the surrounding ambient oxygen-containing environment.

In the above bicell ambient fuel cell assembly, first and second thermally and electrically conductive plates are disposed on opposite sides of the bicell MEA. Each plate includes a first set of thermally and electrically conductive members or fins which extend toward the bicell MEA and contact one of cathodes and a second set of thermally conductive members or fins which extend away from the bicell MEA.

The fins contacting the cathodes provide structural rigidity and support for the MEA. Both sets of fins can be open at the top and bottom to allow air flow through channels formed between the fins. The channels can also be in fluid communication with a source of oxidant or coolant, such as, for example, a manifold. Heat produced by the exothermic chemical reaction of fuel (hydrogen) and oxidant (oxygen) within the bicell MEA is dissipated to the atmosphere through the fins.

In an ambient fuel cell, a unicell membrane electrode assembly includes an anode, a single cathode having a surface exposed to ambient air, and an ion exchange membrane interposed between the anode and the cathode. First and second plates are disposed on opposite sides of the unicell MEA. The first plate has a plurality of electrically and thermally conductive members contacting the exposed cathode surface of the unicell MEA. The second plate is disposed adjacent the surface of the anode facing away from the membrane. A seal forms a fluid-impermeable barrier around the anode and between the membrane and the second plate to isolate the fluid fuel stream directed across the anode from the surrounding ambient oxygen-containing environment.

In the ambient bicell fuel cell described in the '732 application, a rigid fastening mechanism, preferably a rigid tension screw, secures the plates and bicell MEA in assembled form and maintains contact between the electrically conductive fins and the exposed surfaces of cathodes. In the present invention, a compliant compression mechanism is employed in place of rigid tension screws to impart the required compressive load upon each of the plates and the any type of MEA disposed therebetween. Compression is required to maintain electrical contact between the electrically conductive fins and the electrode surfaces of the MEA. Use of a compliant compression mechanism, such as, for example, a series of compression springs, imparts compressive force upon the MEA that does not vary substantially over time as the MEA undergoes compression set, unlike the rigid tension screws in the ambient fuel cell assembly of the '732 application.

In the prior design, the tension screws required periodic tightening to maintain the necessary compressive force. Without such tightening, the electrical contact resistance between the fins and the electrode surface tends to increase over time, and the effective cell voltage is thereby reduced. The use of a compliant compression mechanism such as springs is superior because the springs provide nearly constant compressive forces between plates as the MEA changes thickness over time due to, for example, compression set of any or all of the electrodes in the MEA.

The compliant compression mechanism of the present invention does not significantly increase the length or width of individual ambient fuel cells. In addition, the present compression mechanism does not affect the flow of the oxidant stream through the channels between the fins and the exposed cathode surfaces.

The present compliant compressive mechanism also differs from conventional techniques for assembling and imparting compressive force to non-ambient fuel cell stacks. Conventional fuel cell stacks employ either tension members such as tie rods or compressive members such as pneumatic pistons or disc springs for applying compressive force to the stack end plate. The present compression mechanism employs a spring or series of springs between the outer plates of each individual fuel cell assembly. The individual cell assemblies can in turn be subsequently assembled together and electrically connected into a stack configuration (typically in series but also in parallel) without the need to apply compressive force to the entire stack.

The present compression mechanism may also be employed to compress more than one fuel cell assembly or a fuel cell stack by employing a spring or a series of springs between the outer plates of a plurality of individual fuel cell assemblies or between the end plates of a fuel cell stack.

SUMMARY OF THE INVENTION

A compliant compression mechanism is provided for an electrochemical fuel cell assembly. The assembly comprises a first plate, a second plate, and at least one membrane electrode assembly interposed between the first and second plates. The compliant compression mechanism comprises at least one compliant compression member extending between the first plate and the second plate. In operation, the at least one compression member urges the first plate toward the second plate such that compressive force is applied to the at least one membrane electrode assembly.

In the preferred compliant compression mechanism, the at least one compliant compression member comprises a plurality of compliant compression members. In one embodiment, the at least one compliant compression member comprises at least one twisted wire spring. In another embodiment, the at least one compliant compression member comprises at least one ribbon spring.

The at least one compliant compression member can be formed integrally with one of the first and second plates. Each of the first and second plates preferably has at least one compliant compression member formed integrally therewith, the at least one compliant compression member formed integrally with the first plate interlockingly cooperating with the at least one compliant compression member formed integrally with the second plate.

In a preferred embodiment, each of the first and second plates has at least one mounting rail extending therefrom. The at least one compression member extends between and is mounted within the at least one mounting rail. The at least one mounting rail preferably comprises a pair of mounting rails extending laterally from opposite edges of each of the first and second plates. Each of the at least one compression member extends between and is mounted within the mounting rails.

In alternative preferred embodiment, each of the first and second plates has at least one mounting tab extending therefrom. The at least one compression member extends between and is mounted within the at least one mounting tab. The at least one mounting tab preferably comprises a plurality of mounting tabs extending laterally from opposite edges of each of the first and second plates. Each of the at least one compression member extends between and is mounted within the mounting tabs.

An electrochemical fuel cell assembly with a compliant compression mechanism comprises:

a first plate;

a second plate;

at least one membrane electrode assembly disposed between the first plate and the second plate, each of the at least one membrane electrode assemblies comprising an anode, a cathode, and an ion exchange membrane interposed between the anode and the cathode;

fuel delivery means for delivering fluid fuel to the anode;

oxidant delivery means for delivering fluid oxidant to the cathode;

electrical connection means for providing an electrical connection between the anode, and the cathode;

at least one compliant compression member extending between the first plate and the second plate.

In operation, the at least one compression member urges the first plate toward the second plate such that compressive force is applied to the at least one membrane electrode assembly.

In an electrochemical fuel cell stack embodiment, the at least one membrane electrode assembly comprises a plurality of membrane electrode assemblies, adjacent ones of the membrane electrode assemblies having a separator plate disposed therebetween.

In a preferred electrochemical fuel cell assembly, the at least one compliant compression member comprises a plurality of compression members. The at least one compliant compression member comprises, in one embodiment, at least one twisted wire spring. The at least one compliant compression member comprises, in another embodiment, at least one ribbon spring. The at least one compliant compression member, in still another embodiment, is formed integrally with one of the first and second plates.

In the integrally formed embodiment, each of the first and second plates preferably has at least one compliant compression member formed integrally therewith. The at least one compliant compression member formed integrally with the first plate interlockingly cooperates with the at least one compliant compression member formed integrally with the second plate.

In a preferred fuel cell assembly, each of the first and second plates has at least one mounting rail extending therefrom. The at least one compression member extends between and is mounted within the at least one mounting rail. The at least one mounting rail preferably comprises a pair of mounting rails extending laterally from opposite edges of each of the first and second plates. Each of the at least one compression member extends between and is mounted within the mounting rails.

In another preferred fuel cell assembly, each of the first and second plates has at least one mounting tab extending therefrom. The at least one compression member extends between and is mounted within the at least one mounting tab. The at least one mounting tab comprises a plurality of mounting tabs extending laterally from opposite edges of each of the first and second plates. Each of the at least one compression member extends between and is mounted within the mounting tabs.

In a preferred fuel cell assembly, the fuel delivery means comprises a fuel inlet. An optional fuel outlet directs unreacted components of the fluid fuel stream away from the anode. The oxidant delivery means preferably comprises an oxidant inlet and an oxidant outlet. The oxidant outlet directs unreacted components of the fluid oxidant stream away from the cathode.

In a preferred ambient fuel cell assembly embodiment, the oxidant delivery means comprises a fan for directing oxygen-containing air to the cathode.

In one embodiment, an ambient fuel cell assembly with a compliant compression mechanism comprises:

(a) a bicell membrane electrode assembly comprising a first porous electrically conductive cathode having a surface thereof exposed to ambient air, a porous electrically conductive anode, a second porous electrically conductive cathode having a surface thereof exposed to ambient air, a first ion exchange membrane interposed between the first cathode and the anode, and a second ion exchange membrane interposed between the second cathode and the anode;

(b) sealing means for forming a fluid-impermeable barrier around the anode;

(c) fuel delivery means for delivering fluid fuel to the anode;

(d) electrical connection means for providing an electrical connection to the anode, to the first cathode, and to the second cathode;

(e) a first plate having a plurality of first members extending from a major surface thereof, the first members contacting portions of the exposed first cathode surface, adjacent ones of the first members cooperating with the first plate and the exposed first cathode surface to form at least one air conducting channel;

(f) a second plate having a plurality of second members extending from a major surface thereof, the second members contacting portions of the exposed second cathode surface, adjacent ones of the second members cooperating with the second plate and the exposed second cathode surface to form at least one air conducting channel;

(g) at least one compliant compression member extending between the first and second plates, whereby the at least one compression member urges the first plate toward the second plate such that the first and second electrically conductive members apply compressive force to the bicell membrane electrode assembly.

Another ambient fuel cell assembly embodiment with a compliant compression mechanism comprises:

(a) a unicell membrane electrode assembly comprising a porous electrically conductive anode, a porous electrically conductive cathode having a surface thereof exposed to ambient air, and an ion exchange membrane interposed between the anode and the cathode;

(b) fuel delivery means for supplying a fluid fuel stream to the anode;

(c) electrical connection means for providing an electrical connection to the anode and to the cathode;

(d) a first plate having a plurality of first members extending from a major surface thereof, the first members contacting portions of the exposed cathode surface, adjacent ones of the first members cooperating with the plate and the exposed cathode surface to form at least one air conducting channel;

(e) a second plate disposed adjacent the surface of the anode facing away from the membrane;

(f) sealing means for forming a fluid-impermeable barrier around the anode and between the membrane and the second plate;

(g) at least one compliant compression member extending between the first and second plates, whereby the at least one compression member urges the first plate toward the second plate such that the first and second electrically conductive members apply compressive force to the membrane electrode assembly.

In a preferred ambient fuel cell assembly, each of the first and second plates has at least one mounting rail extending therefrom. The at least one compression member extends between and is mounted within the at least one mounting rail. Most preferably, each of the first and second plates has a pair of mounting rails extending laterally from opposite edges thereof. The fins could also serve as mounting rails.

In a preferred ambient fuel cell assembly, first members extending from a major surface of the plate are electrically conductive and the plate has thermally conductive material extending from another major surface thereof. Heat generated exothermically in the membrane electrode assembly is dissipated to the atmosphere, or alternatively to a coolant fluid, through the material. The material preferably comprises a plurality of thermally conductive members.

The fuel delivery means in ambient fuel cells is normally a dead-ended hydrogen stream. An ambient fuel cell assembly could also include fuel delivery means comprising a fuel inlet and a fuel outlet. The fuel outlet directs unreacted components of the fluid fuel stream away from the anode to either be recirculated to the fuel inlet or exhausted from the system.

An ambient fuel cell stack comprises a plurality of fuel cell assemblies including MEAs having, for example, unicell or bicell MEA configurations, as defined above. The fuel cell stack further comprises:

(1) serial connection means for electrically connecting the plurality of fuel cell assemblies in an electrical series having a first assembly and a last assembly, wherein the anode of each assembly except the last assembly in the series is electrically connected to the cathode of the next adjacent assembly in the series;

(2) a positive current lead electrically connected to the cathode of the first assembly in the series; and (3) a negative current lead electrically connected to the anode of the last assembly in the series.

BRIEF DESCRIPTION OF THE DRAWINGS

FIGS. 9A and 9B are side elevation and end sectional views, respectively, of the ribbon spring compression member illustrated in FIGS. 8A and 8B extending between mounting rails formed in the plates of an ambient fuel cell.

FIGS. 10A and 10B are side and end elevation views, respectively, of a second embodiment of a ribbon spring compression member for a fuel cell with compliant compression mechanism.

FIGS. 11A and 11B are side elevation and end sectional views, respectively, of the ribbon spring compression member illustrated in FIGS. 10A and 10B extending between mounting rails formed in the plates of an ambient fuel cell.

DETAILED DESCRIPTION OF THE PREFERRED EMBODIMENTS

Figure 1:
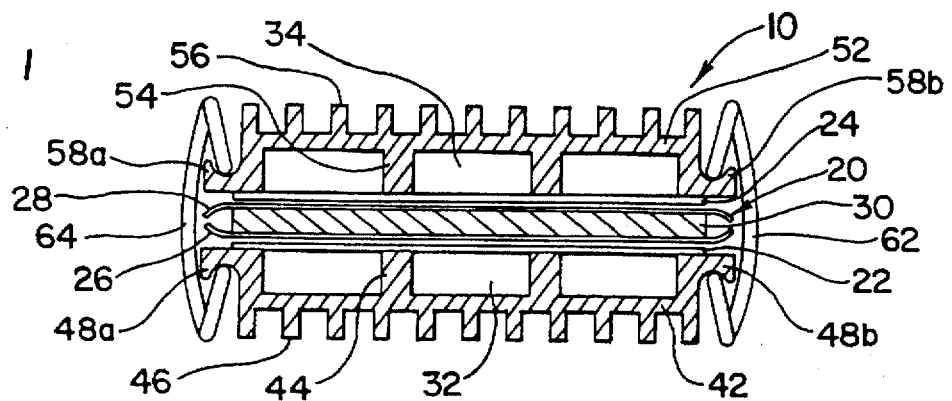
FIG. 1 is an end sectional view of an ambient electrochemical fuel cell with a bicell membrane electrode assembly and a compliant compression mechanism, specifically a pair of oppositely disposed twisted wire springs extending between mounting rails formed in the plates.

Referring first to FIG. 1, an electrochemical fuel cell assembly 10 comprises a bicell membrane electrode assembly ("MEA") 20. Bicell MEA 20 is more fully described in detail in U.S. patent application Ser. No. 08/171,732, previously incorporated herein by reference in its entirety. Bicell MEA 20 comprises a first porous electrically conductive cathode 22 having a surface thereof exposed to ambient air, a porous electrically conductive anode 30, and a second porous electrically conductive cathode 24 having a surface thereof exposed to ambient air. Bicell MEA 20 further comprises a first ion exchange membrane 26 interposed between first cathode 22 and anode 30. A second ion exchange membrane 28 is interposed between second cathode 24 and anode 30.

A fluid-impermeable barrier is formed around anode 30 by, for example, bonding together the edges of the first and second ion membranes 26, 28 to provide a seal, as described in more detail in the '732 application.

Fuel is delivered to anode 30 via, for example, a fuel inlet, as described in more detail in the '732 application. An optional fuel outlet (not shown) directs unreacted components of the fuel stream away from the anode. In hydrogen/oxygen fuel cells, the fluid fuel stream comprises a gaseous hydrogen-containing stream. The present compliant compression mechanism also has utility in other fuel cells employing fluid fuel streams, such as, for example, direct methanol fuel cells in which the fluid fuel stream comprises methanol.

Electrical conductors (not shown) disposed between anode 30 and each of ion exchange membranes 26, 28 extend through the seal around anode 30 to provide an electrical connection to anode 30, to first cathode 22, and to second cathode 24.

Figure 2:
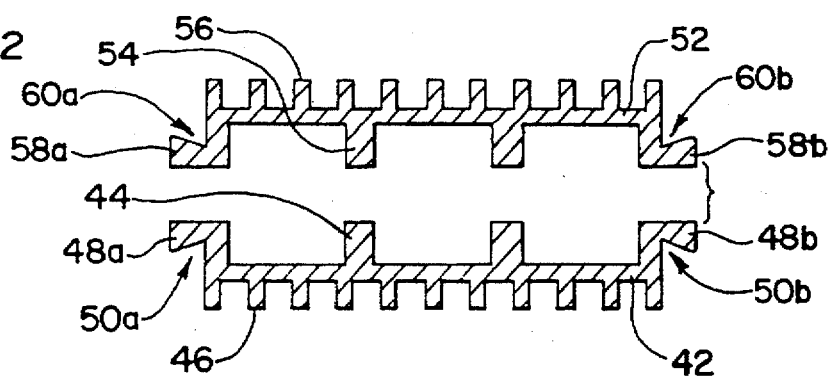
FIG. 2 is an end sectional view of the first and second plates of the fuel cell illustrated in FIG. 1.

As shown in FIGS. 1 and 2, a first plate 42 has a plurality of electrically conductive members, one of which is designated in FIGS. 1 and 2 as electrically conductive member 44, extending from a major surface thereof. Electrically conductive members 44 contact portions of the exposed surface of first cathode 22. Adjacent members 44 cooperate with first plate 42 and the exposed surface of first cathode 22 to form three air conducting channels, one of which is designated in FIG. 1 as channel 32.

As further shown in FIGS. 1 and 2, a second plate 52 has a plurality of electrically conductive members, one of which is designated in FIGS. 1 and 2 as electrically conductive member 54, extending from a major surface thereof. Electrically conductive members 54 contact portions of the exposed surface of second cathode 24. Adjacent ones of second members 54 cooperate with second plate 52 and the exposed surface of second cathode 24 to form three air conducting channels, one of which is designated in FIG. 1 as channel 34.

Figure 3:
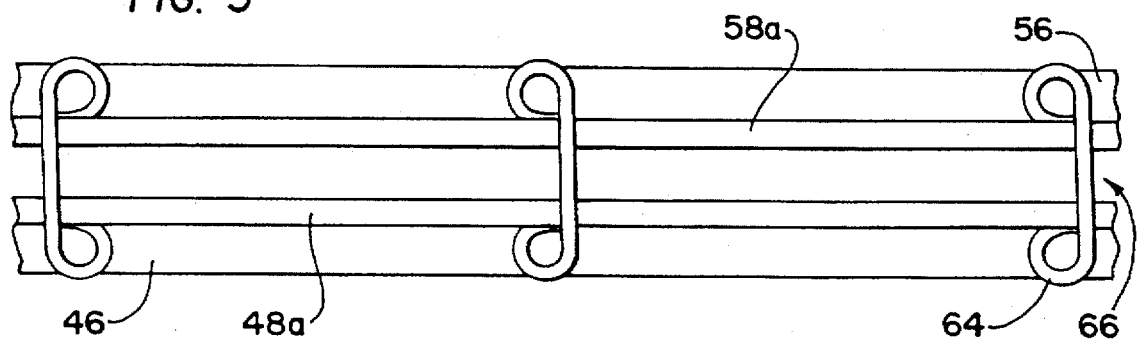
FIG. 3 is a side elevation view of a portion of an ambient fuel cell showing a plurality of springs extending between mounting rails formed in the plates, but excluding the membrane electrode assembly interposed between the plates.

Compliant compression members, shown in FIGS. 1 and 3 as twisted wire springs 62, 64, extend between first plate 42 and second plate 52. Each compression member 62, 64 urges first plate 42 toward second plate 52 such that first and second electrically conductive members 44, 54 apply compressive force to bicell MEA 20.

As shown in FIGS. 1–3, first plate 42 has a pair of mounting rails 48a, 48b extending laterally from opposite edges of first plate 42. Similarly, second plate 52 has a pair of mounting rails 58a, 58b extending laterally from opposite edges of second plate 52. As shown specifically in FIG. 2, grooves 50a, 50b, 60a, 60b are formed in mounting rails 48a, 48b, 58a, 58b, respectively. As shown in FIGS. 1 and 3, compression members 62, 64 extend between and are mounted within grooves 50a, 50b, 60a, 60b. In FIG. 3, the membrane electrode assembly is omitted, but would in practice be interposed between the first and second plates in the volume designated by the numeral 66.

As specifically shown in FIGS. 1 and 2, first plate 42 has a plurality of thermally conductive members 46 extending from another major surface thereof. Second plate 52 also has a plurality of thermally conductive members 56 extending from another major surface thereof. Heat generated exothermically in bicell MEA 20 is dissipated to the atmosphere through the thermally conductive members 46, 56.

Although the embodiment specifically illustrated in FIG. 1 is a bicell MEA, a unicell MEA or another MEA configuration could be substituted for bicell MEA 20 in the embodiments described herein. A unicell membrane electrode assembly is described in detail in the '732 application at page 21, lines 6–24 and FIG. 5, previously incorporated herein by reference. In a unicell MEA arrangement, the second plate 52 is disposed adjacent the surface of the anode facing away from the ion exchange membrane. A seal forms a fluid-impermeable barrier around the anode and between the membrane and the second plate 52, since two membranes are no longer available to perform the sealing around the anode as in the bicell MEA assembly.

Figure 4A:
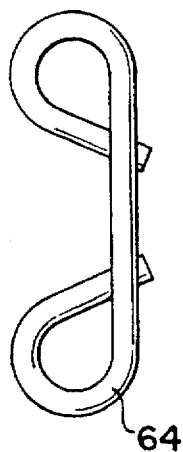
FIGS. 4A, 4B and 4C are side and end elevation views of a first embodiment of a twisted wire spring compression member for a fuel cell with compliant compression mechanism.
Figure 4B:
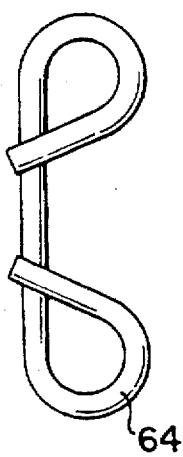
Figure 4C:
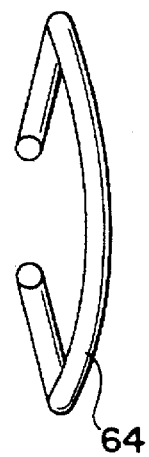

FIGS. 4A, 4B and 4C show side and end elevation views of the twisted wire spring compression member 64 for a fuel cell with compliant compression mechanism such as that illustrated in FIGS. 1–3.

Figure 5A:
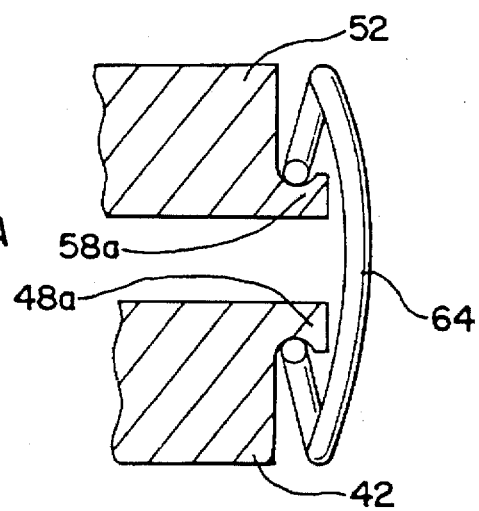
FIGS. 5A, 5B and 5C are side elevation and end sectional views of the twisted wire spring compression member embodiment illustrated in FIGS. 7A, 7B and 7C extending between mounting rails formed in the plates of an ambient fuel cell.
Figure 5B:
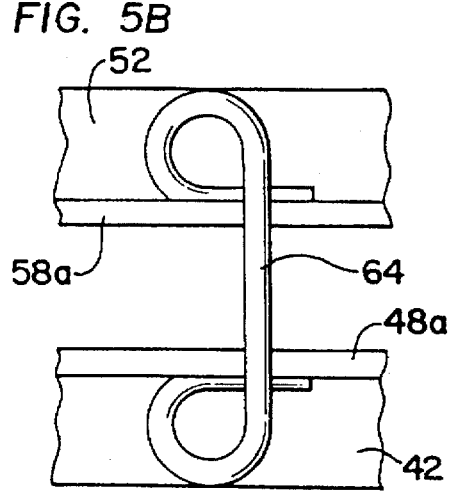
Figure 5C:
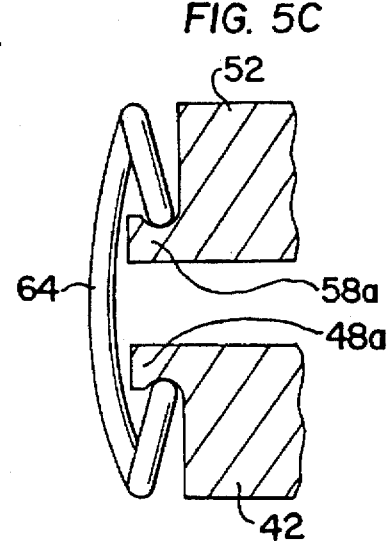

FIGS. 5A, 5B and 5C show side elevation and end sectional views of the twisted wire spring compression member 64 extending between and mounted within grooves formed in mounting rails 48a, 58a, extending laterally from the first and second plates 42, 52 of the ambient fuel cell. The membrane electrode assembly normally interposed between the first and second plates 42, 52 is omitted in FIGS. 5A, 5B and 5C.

Figure 6A:
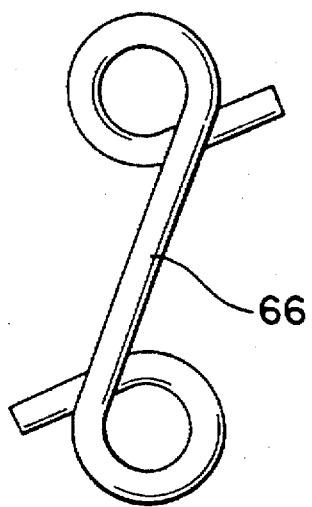
FIGS. 6A and 6B are side and end elevation views, respectively, of a second embodiment of a twisted wire spring compression member for a fuel cell with compliant compression mechanism.
Figure 6B:
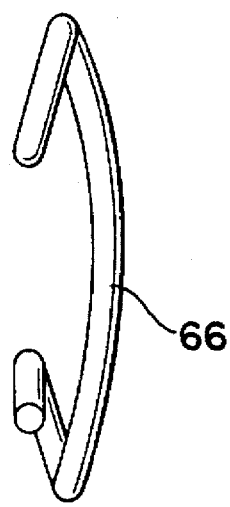

FIGS. 6A and 6B show side and end elevation views, respectively, of a second embodiment of a twisted wire spring compression member 66 for a fuel cell with compliant compression mechanism such as that illustrated in FIGS. 1–3.

Figure 7A:
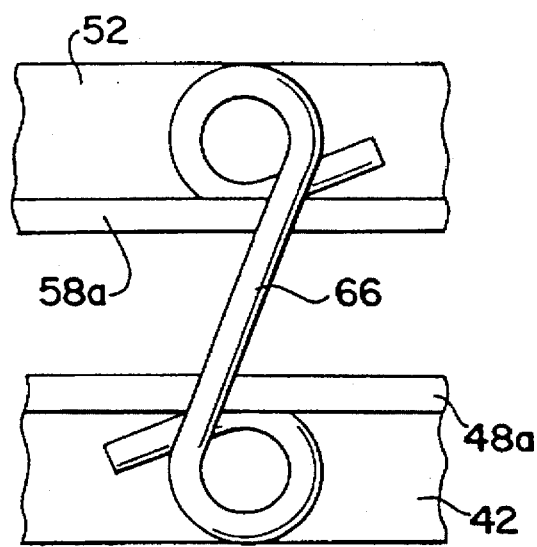
FIGS. 7A and 7B are side elevation and end sectional views, respectively, of the twisted wire spring compression member illustrated in FIGS. 6A and 6B extending between mounting rails formed in the plates of an ambient fuel cell.
Figure 7B:
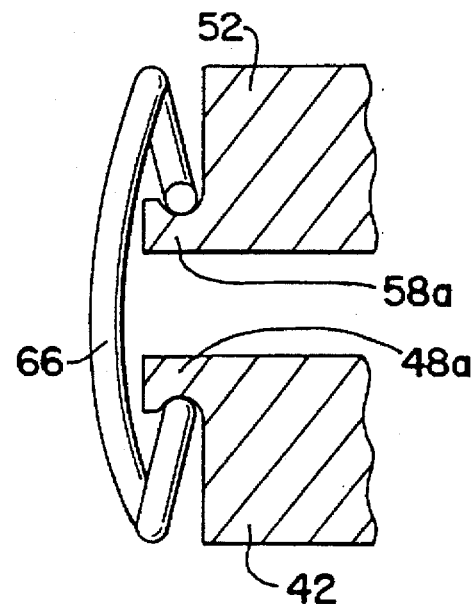

FIGS. 7A and 7B show side elevation and end sectional views, respectively, of the twisted wire spring compression member 66 extending between and mounted within grooves formed in mounting rails 48a, 58a extending laterally from plates 42, 52 of the ambient fuel cell. The membrane electrode assembly normally interposed between the first and second plates 42, 52 is omitted in FIGS. 7A and 7B.

Figure 8A:
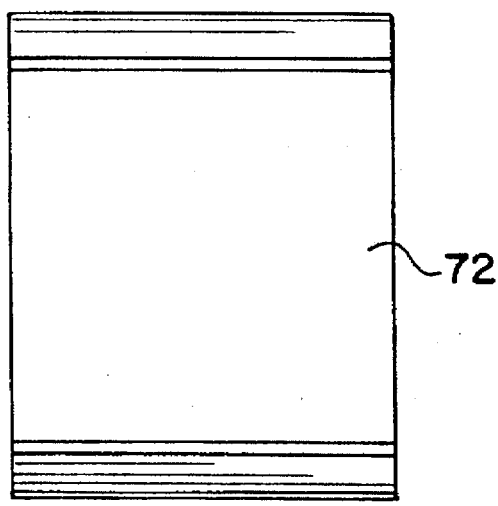
FIGS. 8A, 8B and 8C are side elevation, end elevation, and isometric views, respectively, of a first embodiment of a ribbon spring compression member for the a fuel cell with compliant compression mechanism.
Figure 8B:
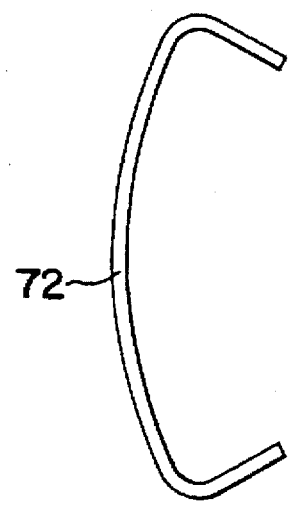
Figure 8C:
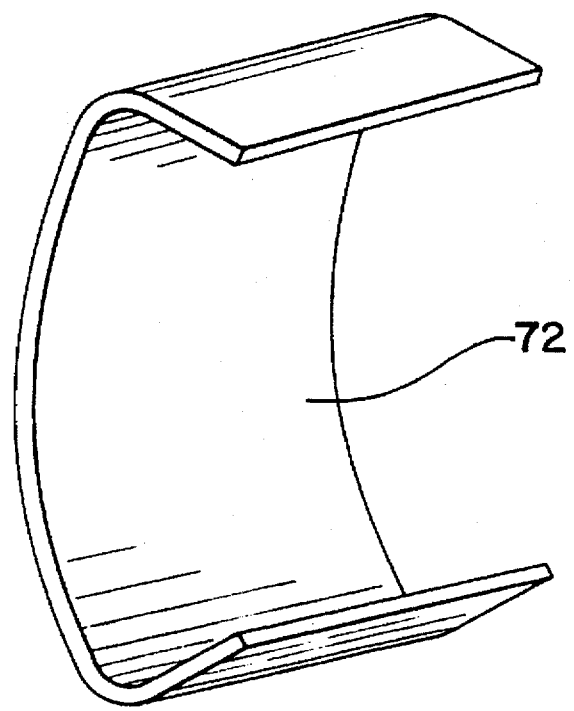

FIGS. 8A, 8B and 8C show side elevation, end elevation and isometric views, respectively, of a first embodiment of a ribbon spring compression member 72 for a fuel cell with compliant compression mechanism such as that illustrated in FIGS. 1–3. Ribbon spring 72 is sometimes also referred to as a ribbon clip.

FIGS. 9A and 9B show side elevation and end sectional views, respectively, of ribbon spring compression member 72 extending between and mounted within grooves formed in mounting rails 48a, 58a extending laterally from the plates 42, 52 of the ambient fuel cell. The membrane electrode assembly normally interposed between the first and second plates 42, 52 is omitted in FIGS. 9A and 9B.

FIGS. 10A and 10B show side and end elevation views, respectively, of a second embodiment of a ribbon spring compression member 74 for a fuel cell with compliant compression mechanism such as that illustrated in FIGS. 1–3.

FIGS. 11A and 11B show side elevation and end sectional views, respectively, of ribbon spring compression member 74 extending between and mounted within grooves formed in mounting rails 48a, 58a extending laterally from the plates 42, 52 of the ambient fuel cell. The membrane electrode assembly normally interposed between the first and second plates 42, 52 is omitted in FIGS. 11A and 11B.

Figure 12A:
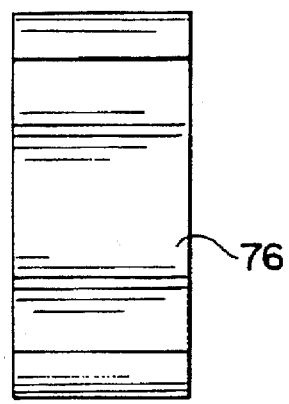
FIGS. 12A and 12B are side and end elevation views, respectively, of a third embodiment of a ribbon spring compression member for a fuel cell with compliant compression mechanism.
Figure 12B:
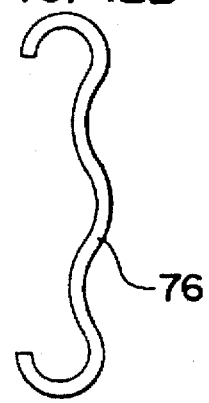

FIGS. 12A and 12B show side and end elevation views, respectively, of a third embodiment of a ribbon spring compression member 76 for a fuel cell with compliant compression mechanism such as that illustrated in FIGS. 1–3.

Figure 13A:
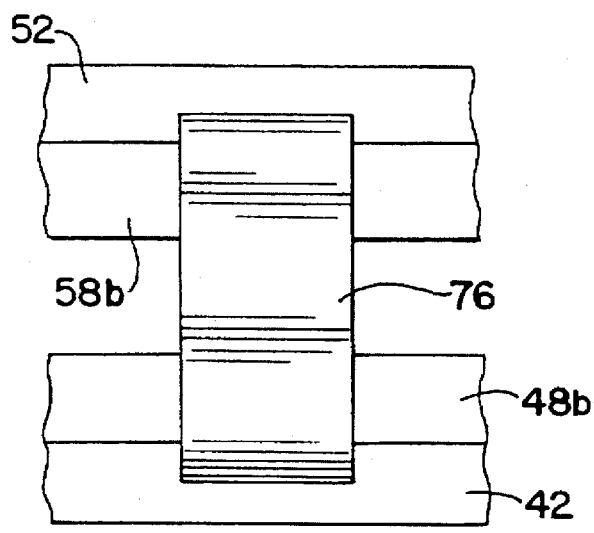
FIGS. 13A and 13B are side elevation and end sectional views, respectively, of the ribbon spring compression member illustrated in FIGS. 12A and 12B extending between mounting rails formed in the plates of an ambient fuel cell.
Figure 13B:
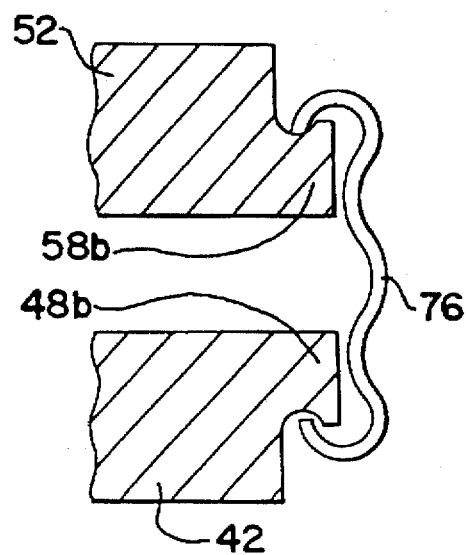

FIGS. 13A and 13B show side elevation and end sectional views, respectively, of the ribbon spring compression member 76 extending between and mounted within grooves formed in mounting rails 48a, 58a extending laterally from the plates 42, 52 of the ambient fuel cell. The membrane electrode assembly normally interposed between the first and second plates 42, 52 is omitted in FIGS. 13A and 13B.

Figure 14A:
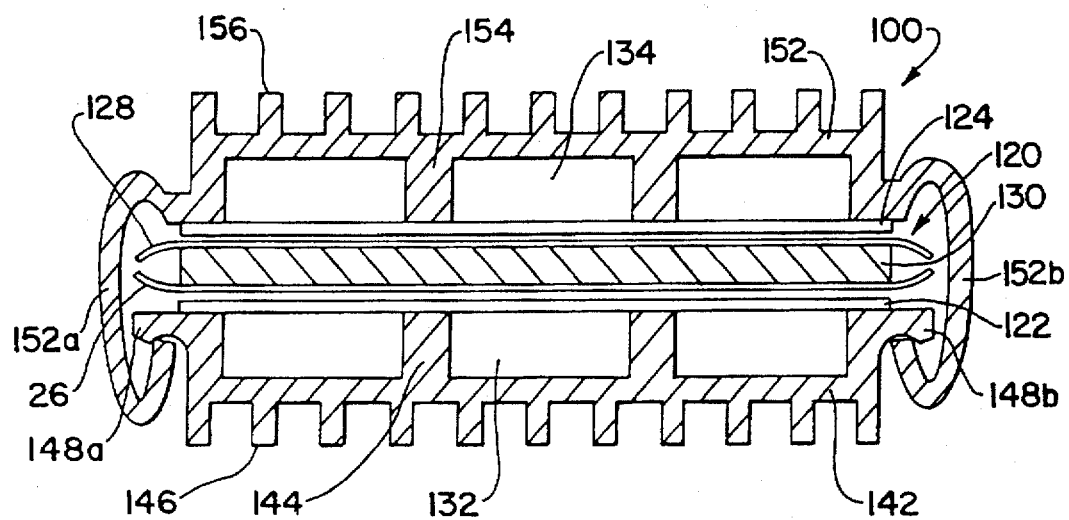
FIGS. 14A and 14B are end sectional views of a first and second embodiment, respectively, of an ambient fuel cell in which the plates have integral compliant compression members.

FIG. 14A shows a first embodiment of an ambient fuel cell assembly 100 in which the conductive plates have integral compliant compression members. Fuel cell assembly 100 comprises a bicell MEA 120 which is substantially identical to bicell MEA 20 in FIG. 1. Bicell MEA 120 comprises a first porous electrically conductive cathode 122 having a surface thereof exposed to ambient air, a porous electrically conductive anode 130, and a second porous electrically conductive cathode 124 having a surface thereof exposed to ambient air. Bicell MEA 120 further comprises a first ion exchange membrane 126 interposed between first cathode 122 and anode 130. A second ion exchange membrane 128 is interposed between second cathode 124 and anode 130.

A fluid-impermeable barrier is formed around anode 130 by, for example, bonding together the edges of the first and second ion membranes 126, 128 to provide a seal.

Electrical conductors (not shown) disposed between anode 130 and each of ion exchange membranes 126, 128 extend through the seal around anode 130 to provide an electrical connection to anode 130, to first cathode 122, and to second cathode 124.

A first plate 142 has a plurality of electrically conductive members, one of which is designated in FIG. 1 as conductive member 144, extending from a major surface thereof. Electrically conductive members 144 contact portions of the exposed surface of first cathode 122. Adjacent members 144 cooperate with first plate 142 and the exposed surface of first cathode 122 to form three air conducting channels, one of which is designated in FIG. 14A as channel 132. A second plate 152 has a plurality of electrically conductive members, one of which is designated in FIG. 14A as conductive member 154, extending from a major surface thereof. Electrically conductive members 154 contact portions of the exposed surface of second cathode 124. Adjacent ones of second members 154 cooperate with second plate 152 and the exposed surface of second cathode 124 to form three air conducting channels, one of which is designated in FIG. 14A as channel 134.

Integral compliant compression members, shown in FIG. 14A as members 152a, 152b, extend from second plate 152 to first plate 142. Each compression member 152a, 152b urges first plate 142 toward second plate 152 such that first and second electrically conductive members 144, 154 apply compressive force to bicell MEA 120.

As shown in FIG. 14A, first plate 142 has a pair of mounting rails 148a, 148b extending laterally from opposite edges of first plate 142. Grooves are formed in mounting rails 148a, 148b. Compression members 152a, 152b extend from plate 152 towards and are mounted within the grooves formed in mounting rails 148a, 148b.

Figure 14B:
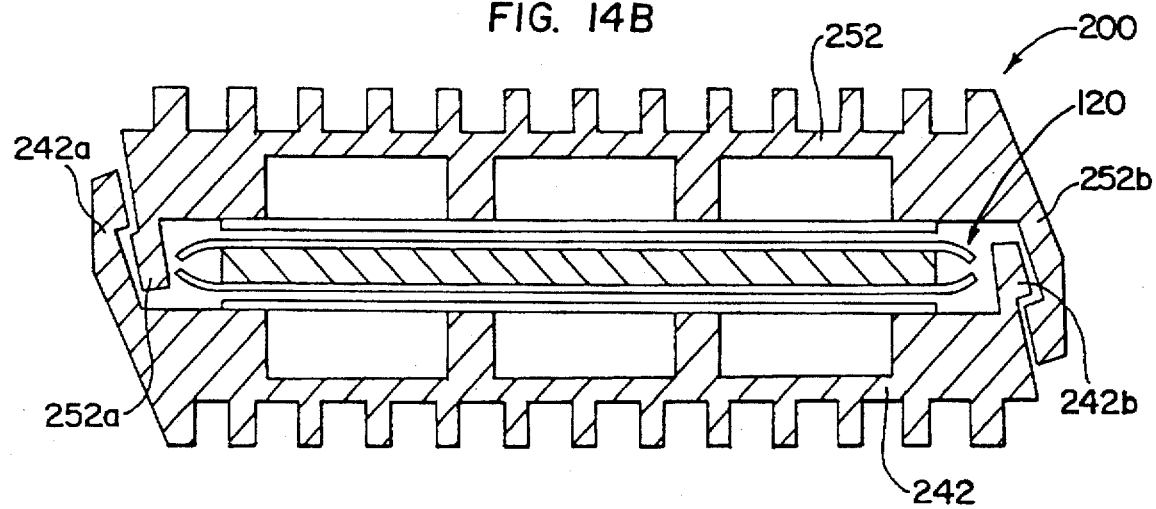

FIG. 14B shows a second embodiment of an ambient fuel cell assembly 200 in which the conductive plates have integral compliant compression members. Like the first embodiment shown in FIG. 14A, fuel cell assembly 200 comprises a bicell MEA 120 which is substantially identical to bicell MEA 20 in FIG. 1.

Integral compliant compression members, shown in FIG. 14B as members 242a, 242b, 252a, 252b, extend between first and second plates 242, 252. Compression members 242a, 242b, 252a, 252b urge first plate 242 toward second plate 252 such that compressive force is applied to bicell MEA 120.

As shown in FIG. 14B, compression member 242a of first plate 242 cooperates with compression member 252a of second plate 252. Similarly, compression member 242b of first plate 242 cooperates with compression member 252b of second plate 252. Each of compression members 242a, 242b, 252a, 252b is formed with an interlocking tab.

Figure 15A:
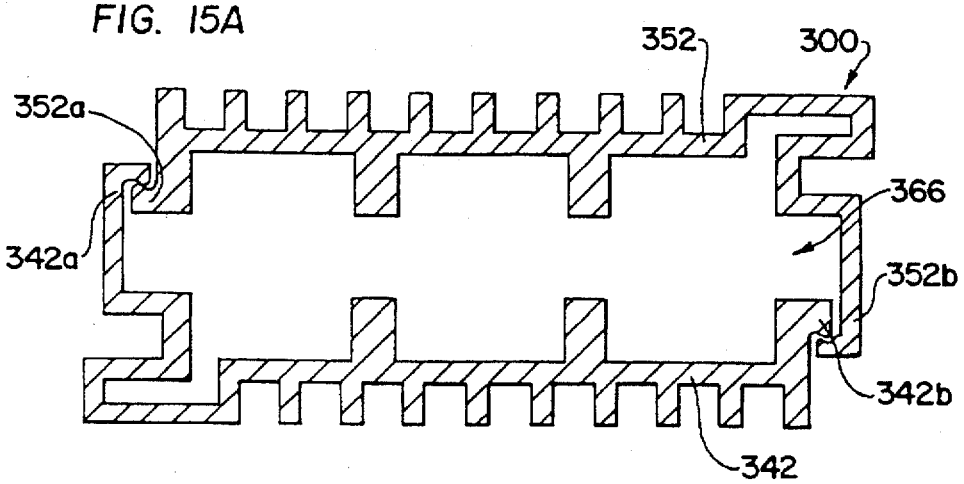
FIGS. 15A and 15B are end sectional views of third and fourth embodiments of the plates for an ambient fuel cell in which the plates have integral compliant compression members.

FIG. 15A shows a third embodiment of the conductive plates 342, 352 for an ambient fuel cell assembly 300. The membrane electrode assembly is omitted in FIG. 15A, but would in practice be interposed between first and second plates 342, 352 in the volume designated by the numeral 366. Compression member 342a of first plate 342 cooperates with compression member 352a of second plate 352. Similarly, compression member 342b of first plate 342 cooperates with compression member 352b of first plate 352. Each of compression members 342a, 342b, 352a, 352b is formed with an interlocking tab. Compression member 342a, 342b, 352a, 352b urge first plate 342 toward second plate 352 such that compressive force is applied to the MEA (not shown) interposed between plates 342, 352.

Figure 15B:
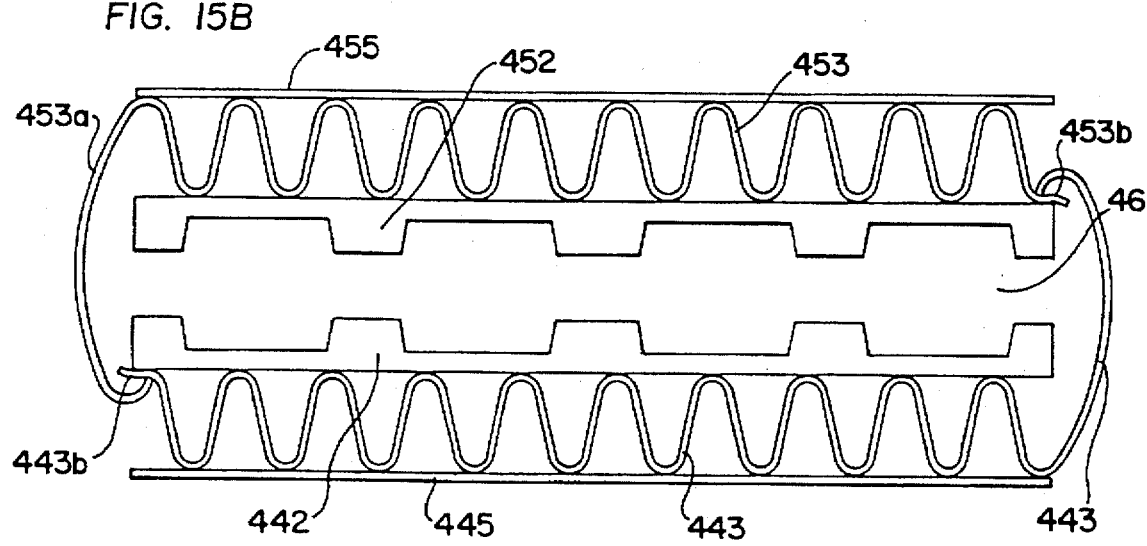

FIG. 15B shows a third embodiment of the conductive plates 442, 452 for an ambient fuel cell assembly 400. The membrane electrode assembly is omitted in FIG. 15A, but would in practice be interposed between first and second plates 442, 452, in the volume designated by the numeral 466. First plate 442 has associated therewith a first sinusoidally extending, thermally conductive member 443 and a bottom plate 445. Similarly, second plate 452 has associated therewith a second sinusoidally extending, thermally conductive member 453 and a top plate 455. Compression member 443a extending from first thermally conductive member 443 cooperates with member 453b of second thermally conductive member 453. Similarly, compression member 453a of second thermally conductive member 453 cooperates with member 443b of first thermally conductive member 443. Compression members 443a, 453a urge first plate 442 toward second plate 452 such that compressive force is applied to the MEA (not shown) interposed between plates 442, 452.

Figure 16:
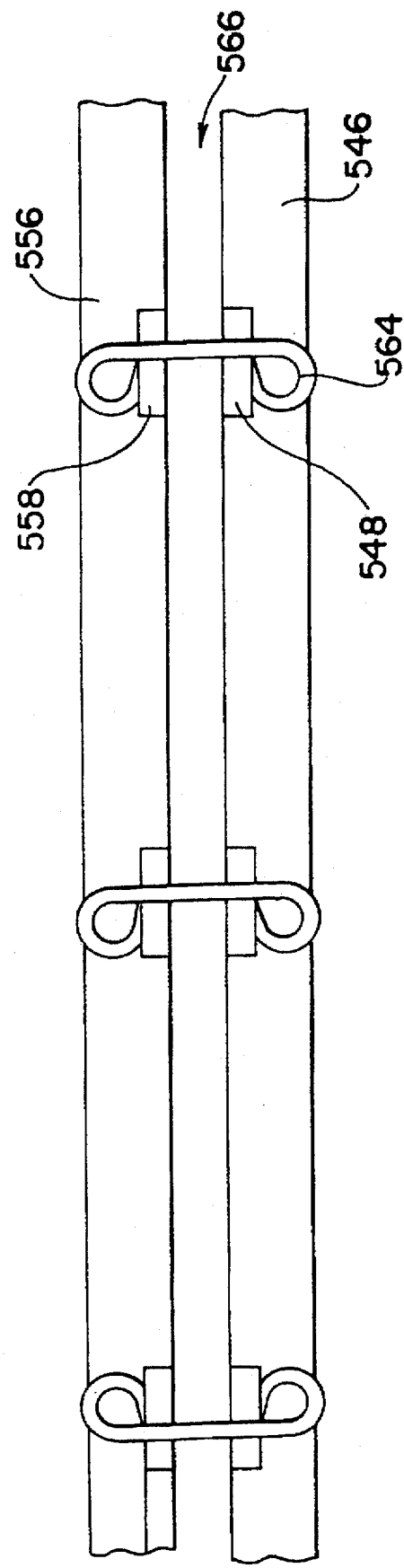
FIG. 16 is a side elevation view of a portion of an ambient fuel cell showing a plurality of springs extending between mounting tabs formed in the plates, but excluding the membrane electrode assembly interposed between the plates.

FIG. 16 shows a portion of an ambient fuel cell showing a plurality of springs extending between mounting tabs formed in the conductive plates 546, 556. Mounting tabs, one of which is designated in FIG. 16 as tab 548, extend laterally from first plate 546. Similarly, mounting tabs, one of which is designated in FIG. 16 as tab 558, extend laterally from second plate 556. Compression members, one of which is designated in FIG. 16 as twisted wire spring compression member 564, extend between and are mounted within grooves formed in tabs 548, 558. The membrane electrode assembly is omitted in FIG. 16, but would in practice be interposed between first and second plates 546, 556 in the volume designated by the numeral 566.

Figure 17:
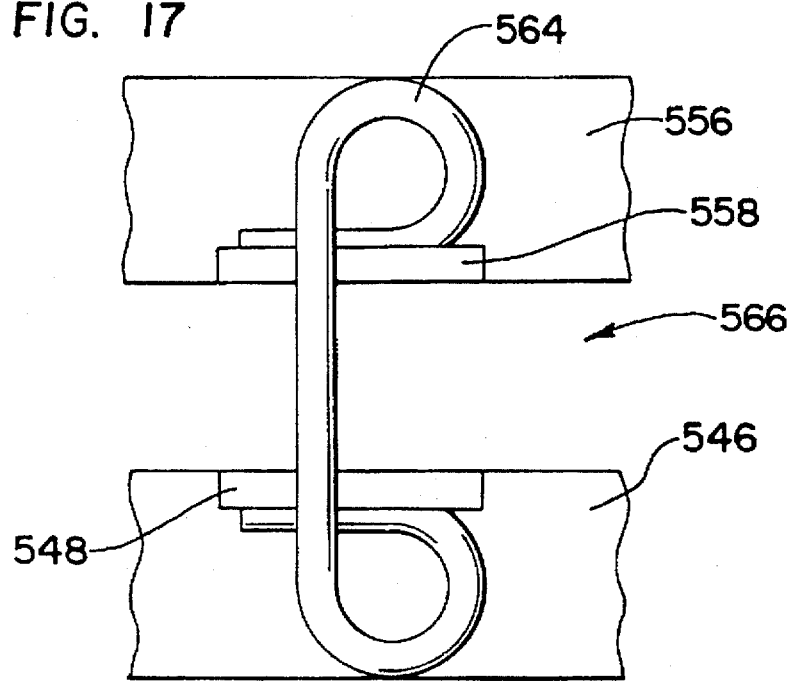
FIG. 17 is an enlarged side elevation view of a portion of the ambient fuel cell of FIG. 16 showing a first embodiment of a twisted wire spring compression member extending between mounting tabs formed in the plates.

FIG. 17 is an enlarged view of a portion of the ambient fuel cell of FIG. 16 showing twisted wire spring compression member 564 extending between mounting tabs 548, 558 formed in first and second conductive plates 546, 556, respectively. As in FIG. 16, the membrane electrode assembly is omitted in FIG. 17, but would in practice be interposed between first and second plates 546, 556 in the volume designated by the numeral 566.

Figure 18:
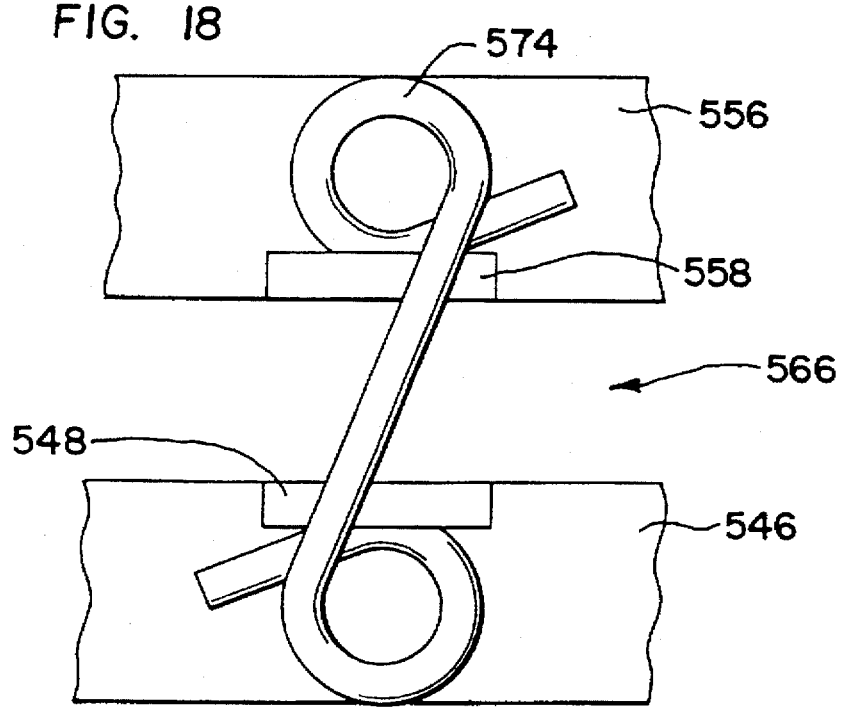
FIG. 18 is an enlarged side elevation view of a portion of the ambient fuel cell of FIG. 16 showing a second embodiment of a twisted wire spring compression member extending between mounting tabs formed in the plates.

FIG. 18 is an enlarged view of a portion of the ambient fuel cell of FIG. 16 showing a second embodiment of a twisted wire spring compression member 574 extending between mounting tabs 548, 558 formed in first and second conductive plates 546, 556, respectively. As in FIG. 16, the membrane electrode assembly is omitted in FIG. 18, but would in practice be interposed between first and second plates 546, 556 in the volume designated by the numeral 566.

Figure 19:
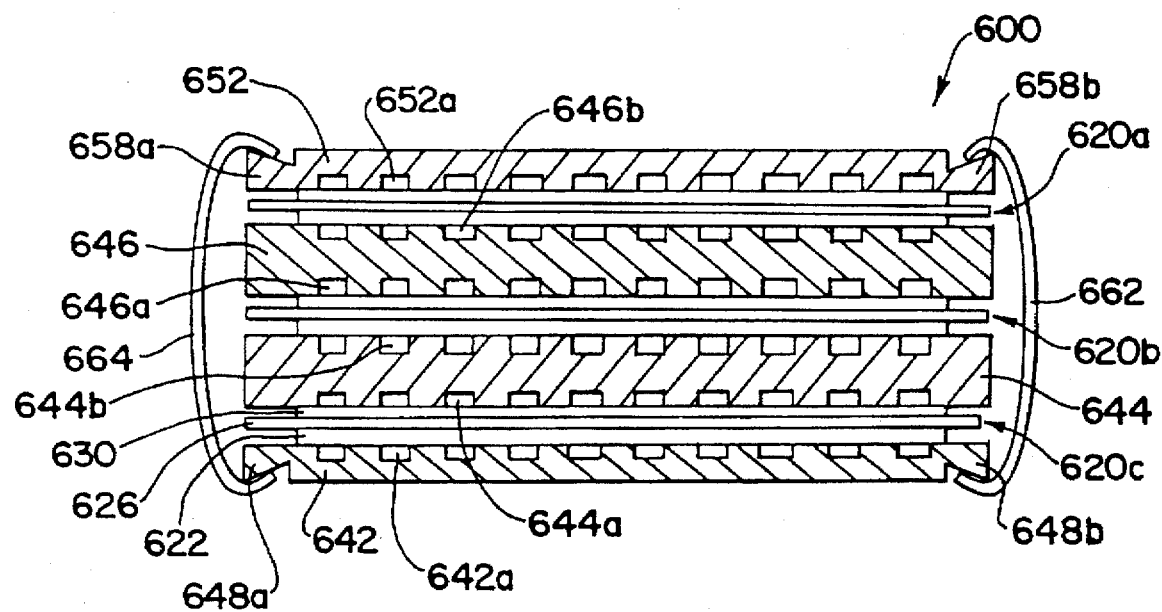
FIG. 19 is an end sectional view of an electrochemical fuel cell stack with a compliant compression mechanism, specifically a pair of oppositely disposed ribbon springs extending between mounting rails formed in the end plates.

FIG. 19 shows an electrochemical fuel cell stack 600 with a compliant compression mechanism, specifically a pair of oppositely disposed ribbon springs 662, 664 extending between mounting rails formed in first and second plates 642, 652. Stack 600 includes three identical membrane electrode assemblies 620a, 620b, 620c. As shown in FIG. 19, MEA 620c comprises a cathode 622, an ion exchange membrane 626, and an anode 630. First plate 642 has formed in its upper major surface at least one channel 642a for directing an oxidant stream across the lower major surface of cathode 622. A separator plate 644 has formed in its lower major surface at least one channel 644a for directing a fuel stream across the upper major surface of anode 630. Separator plate 644 has formed in its upper major surface at least one channel 644b for directing an oxidant stream across the upper surface of the cathode of MEA 620b. A separator plate 646 has formed in its lower major surface at least one channel 646a for directing a fuel stream across the upper major surface of the anode of MEA 620b. Separator plate 646 has formed in its upper major surface at least one channel 646b for directing an oxidant stream across the upper surface of the cathode of MEA 620c. Second plate 652 has formed in its lower major surface at least one channel 652a for directing a fuel stream across the upper major surface of the anode of MEA 620c.

Compliant compression members, shown in FIG. 19 as ribbon springs 662, 664, extend between first plate 642 and second plate 652. Each compression member 662, 664 urges first plate 642 toward second plate 652 such that compressive force is applied to MEAs 620a, 620b and 620c. As shown in FIG. 19, first plate 642 has a pair of mounting rails 648a, 648b extending laterally from opposite edges of first plate 642. Similarly, second plate 652 has a pair of mounting rails 658a, 658b extending laterally from opposite edges of second plate 652. Grooves are formed in mounting rails 648a, 648b, 658a, 658b. Compression members 662, 664 extend between and are mounted within the grooves.

In operation, the present compliant compression mechanism urges the first plate toward the second plate, thereby sandwiching the MEA between the plates and maintaining sufficient electrical conductivity between the exposed cathode surfaces and the electrically conductive members extending from the plates toward the cathodes to promote efficient fuel cell performance.

The present ambient fuel cell assembly with a compliant compression mechanism provides practical advantages over prior art configurations. In this regard, the present design permits the construction of individual, independent, stand-alone fuel cell units, or subassemblies of fuel cell units, which can be subsequently employed as building blocks to construct a multi-cell stack in a variety of stack configurations without requiring compression of the overall stack.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A compliant compression mechanism for an electrochemical fuel cell assembly, said assembly comprising a first plate, a second plate, and at least one membrane electrode assembly interposed between the first and second plates, said mechanism comprising at least one compliant compression member extending between said first plate and said second plate, whereby said at least one compression member urges said first plate toward said second plate such that compressive force is applied to said at least one membrane electrode assembly, wherein said at least one compliant compression member comprises at least one twisted wire spring.

2. A compliant compression mechanism for an electrochemical fuel cell assembly, said assembly comprising a first plate, a second plate, and at least one membrane electrode assembly interposed between the first and second plates, said mechanism comprising at least one compliant compression member extending between said first plate and said second plate, whereby said at least one compression member urges said first plate toward said second plate such that compressive force is applied to said at least one membrane electrode assembly, wherein said at least one compliant compression member is formed integrally with one of said first and second plates.

3. The compliant compression mechanism of claim 2 wherein each of said first and second plates has at least one compliant compression member formed integrally therewith, said at least one compliant compression member formed integrally with said first plate interlockingly cooperating with said at least one compliant compression member formed integrally with said second plate.

4. An electrochemical fuel cell assembly comprising:

a first plate;

a second plate;

at least one membrane electrode assembly disposed between said first plate and said second plate, each of said at least one membrane electrode assemblies comprising an anode, a cathode, and an ion exchange membrane interposed between said anode and said cathode;

fuel delivery means for delivering fluid fuel to said anode;

oxidant delivery means for delivering fluid oxidant to said cathode;

electrical connection means for providing an electrical connection between said anode, and said cathode;

at least one compliant compression member extending between said first plate and said second plate, whereby said at least one compression member urges said first plate toward said second plate such that compressive force is applied to said at least one membrane electrode assembly, wherein said at least one compliant compression member comprises at least one twisted wire spring.

5. The electrochemical fuel cell assembly of claim 1 wherein said at least one compliant compression member comprises at least one ribbon spring.

6. An electrochemical fuel cell assembly comprising:

a first plate;

a second plate;

at least one membrane electrode assembly disposed between said first plate and said second plate, each of said at least one membrane electrode assemblies comprising an anode, a cathode, and an ion exchange membrane interposed between said anode and said cathode;

fuel delivery means for delivering fluid fuel to said anode;

oxidant delivery means for delivering fluid oxidant to said cathode;

electrical connection means for providing an electrical connection between said anode, and said cathode;

at least one compliant compression member extending between said first plate and said second plate, whereby said at least one compression member urges said first plate toward said second plate such that compressive force is applied to said at least one membrane electrode assembly, wherein said at least one compliant compression member is formed integrally with one of said first and second plates.

7. The electrochemical fuel cell assembly of claim 6 wherein each of said first and second plates has at least one compliant compression member formed integrally therewith, said at least one compliant compression member formed integrally with said first plate interlockingly cooperating with said at least one compliant compression member formed integrally with said second plate.

8. An electrochemical fuel cell assembly comprising:

a bicell membrane electrode assembly comprising a first porous electrically conductive cathode having a surface thereof exposed to ambient air, a porous electrically conductive anode, a second porous electrically conductive cathode having a surface thereof exposed to ambient air, a first ion exchange membrane interposed between said first cathode and said anode, and a second ion exchange membrane interposed between said second cathode and said anode;

sealing means for forming a fluid-impermeable barrier around said anode;

fuel delivery means for delivering fluid fuel to said anode;

electrical connection means for providing an electrical connection to said anode, to said first cathode, and to said second cathode;

a first plate having a plurality of first electrically conductive members extending from a major surface thereof, said first members contacting portions of said exposed first cathode surface, adjacent ones of said first members cooperating with said first plate and said exposed first cathode surface to form at least one air conducting channel;

a second plate having a plurality of second electrically conductive members extending from a major surface thereof, said second members contacting portions of said exposed second cathode surface, adjacent ones of said second members cooperating with said second plate and said exposed second cathode surface to form at least one air conducting channel;

at least one compliant compression member extending between said first and second plates, whereby said at least one compression member urges said first plate toward said second plate such that said first and second electrically conductive members apply compressive force to said bicell membrane electrode assembly, wherein said at least one compliant compression member comprises at least one twisted wire spring.

9. An electrochemical fuel cell assembly comprising:

a bicell membrane electrode assembly comprising a first porous electrically conductive cathode having a surface thereof exposed to ambient air, a porous electrically conductive anode, a second porous electrically conductive cathode having a surface thereof exposed to ambient air, a first ion exchange membrane interposed between said first cathode and said anode, and a second ion exchange membrane interposed between said second cathode and said anode;

sealing means for forming a fluid-impermeable barrier around said anode;

fuel delivery means for delivering fluid fuel to said anode;

electrical connection means for providing an electrical connection to said anode, to said first cathode, and to said second cathode;

a first plate having a plurality of first electrically conductive members extending from a major surface thereof, said first members contacting portions of said exposed first cathode surface, adjacent ones of said first members cooperating with said first plate and said exposed first cathode surface to form at least one air conducting channel;

a second plate having a plurality of second electrically conductive members extending from a major surface thereof, said second members contacting portions of said exposed second cathode surface, adjacent ones of said second members cooperating with said second plate and said exposed second cathode surface to form at least one air conducting channel;

at least one compliant compression member extending between said first and second plates, whereby said at least one compression member urges said first plate toward said second plate such that said first and second electrically conductive members apply compressive force to said bicell membrane electrode assembly, wherein said at least one compliant compression member is formed integrally with one of said first and second plates.

10. The electrochemical fuel cell assembly of claim 9 wherein each of said first and second plates has at least one compliant compression member formed integrally therewith, said at least one compliant compression member formed integrally with said first plate interlockingly cooperating with said at least one compliant compression member formed integrally with said second plate.

11. An electrochemical fuel cell assembly comprising:

a unicell membrane electrode assembly comprising a porous electrically conductive anode, a porous electrically conductive cathode having a surface thereof exposed to ambient air, and an ion exchange membrane interposed between said anode and said cathode;

fuel delivery means for supplying a fluid fuel stream to said anode;

electrical connection means for providing an electrical connection to said anode and to said cathode;

a first plate having a plurality of first electrically conductive members extending from a major surface thereof, said first members contacting portions of said exposed cathode surface, adjacent ones of said first members cooperating with said plate and said exposed cathode surface to format least one air conducting channel;

a second plate disposed adjacent the surface of said anode facing away from said membrane;

sealing means for forming a fluid-impermeable barrier around said anode and between said membrane and said second plate;

at least one compliant compression member extending between said first and second plates, whereby said at least one compression member urges said first plate toward said second plate such that said first and second electrically conductive members apply compressive force to said membrane electrode assembly, wherein said at least one compliant compression member comprises at least one twisted wire spring.

12. An electrochemical fuel cell assembly comprising:

a unicell membrane electrode assembly comprising a porous electrically conductive anode, a porous electrically conductive cathode having a surface thereof exposed to ambient air, and an ion exchange membrane interposed between said anode and said cathode;

fuel delivery means for supplying a fluid fuel stream to said anode;

electrical connection means for providing an electrical connection to said anode and to said cathode;

a first plate having a plurality of first electrically conductive members extending from a major surface thereof, said first members contacting portions of said exposed cathode surface, adjacent ones of said first members cooperating with said plate and said exposed cathode surface to form at least one air conducting channel;

a second plate disposed adjacent the surface of said anode facing away from said membrane;

sealing means for forming a fluid-impermeable barrier around said anode and between said membrane and said second plate;

at least one compliant compression member extending between said first and second plates, whereby said at least one compression member urges said first plate toward said second plate such that said first and second electrically conductive members apply compressive force to said membrane electrode assembly, wherein said at least one compliant compression member is formed integrally with one of said first and second plates.

13. The electrochemical fuel cell assembly of claim 12 wherein each of said first and second plates has at least one compliant compression member formed integrally therewith, said at least one compliant compression member formed integrally with said first plate interlockingly cooperating with said at least one compliant compression member formed integrally with said second plate.

* * * * *

UNITED STATES PATENT AND TRADEMARK OFFICE
CERTIFICATE OF CORRECTION

PATENT NO.    : 5,686,200
DATED :       November 11, 1997
INVENTOR(S):  Barton et al.

It is certified that error appears in the above-identified patent and that said Letters Patent is hereby corrected as shown below:

Col. 7, line 18, "FIGS. 7A, 7B AND 7C" should read --FIGS. 4A, 4B and 4C--.

Col. 11, line 54, "FIG. 15A" should read --FIG. 15B--.

Signed and Sealed this

Tenth Day of March, 1998

Attest:

BRUCE LEHMAN

Attesting Officer

Commissioner of Patents and Trademarks